United States Patent
Salehiomran et al.

(10) Patent No.: US 11,764,536 B2
(45) Date of Patent: Sep. 19, 2023

(54) OPTICAL AMPLIFIER FOR MULTIPLE BANDS

(71) Applicant: Lumentum Operations LLC, San Jose, CA (US)

(72) Inventors: Ali Salehiomran, Gatineau (CA); Michael Demerchant, Ottawa (CA); Brian Smith, Stittsville (CA); Peter David Roorda, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 334 days.

(21) Appl. No.: 16/949,337

(22) Filed: Oct. 26, 2020

(65) Prior Publication Data
US 2022/0069539 A1    Mar. 3, 2022

Related U.S. Application Data

(60) Provisional application No. 62/706,583, filed on Aug. 26, 2020.

(51) Int. Cl.
| | |
|---|---|
| *H01S 3/067* | (2006.01) |
| *H01S 3/10* | (2006.01) |
| *H01S 3/16* | (2006.01) |

(52) U.S. Cl.
CPC ........ *H01S 3/06758* (2013.01); *H01S 3/0677* (2013.01); *H01S 3/06766* (2013.01); *H01S 3/10015* (2013.01); *H01S 3/10023* (2013.01); *H01S 3/1608* (2013.01)

(58) Field of Classification Search
None
See application file for complete search history.

(56) References Cited

U.S. PATENT DOCUMENTS

| | | | |
|---|---|---|---|
| 6,532,104 B1 | 3/2003 | Bayart | |
| 6,728,028 B1 * | 4/2004 | Rodriguez | H01S 3/06758 359/341.32 |
| 6,882,466 B1 * | 4/2005 | Shimojoh | H01S 3/06758 359/341.33 |
| 2020/0194961 A1 * | 6/2020 | Luo | H01S 3/2316 |
| 2021/0376550 A1 * | 12/2021 | Foursa | H01S 3/10023 |

FOREIGN PATENT DOCUMENTS

EP    1091509 A1    4/2001

OTHER PUBLICATIONS

Sun et al., "A Gain-Flattened Ultra Wide Band EDFA for High Capacity WDM Optical Communications Systems," ECOC 1998, Sep. 20-24, 1998, Madrid, Spain, pp. 53-54.

\* cited by examiner

*Primary Examiner* — Eric L Bolda
(74) *Attorney, Agent, or Firm* — Harrity & Harrity, LLP

(57) ABSTRACT

In some implementations, an amplifier device may include a first amplifier configured to amplify signals in a first range of optical wavelengths. The first amplifier may include a first portion that includes one or more first optical gain components, and a second portion that includes one or more second optical gain components and a variable optical attenuator. The amplifier device may include a second amplifier configured to amplify signals in a second range of optical wavelengths. The amplifier device may include a filter for the first range of optical wavelengths and the second range of optical wavelengths. The filter may be located between the first portion and the second portion of the first amplifier.

20 Claims, 3 Drawing Sheets

OPTICAL AMPLIFIER FOR MULTIPLE BANDS

CROSS-REFERENCE TO RELATED APPLICATION

This Patent application claims priority to U.S. Provisional Patent Application No. 62/706,583, filed on Aug. 26, 2020, and entitled "INTEGRATED C-BAND AND L-BAND ERBIUM DOPED FIBER AMPLIFIERS." The disclosure of the prior Application is considered part of and is incorporated by reference into this Patent Application.

TECHNICAL FIELD

The present disclosure relates generally to optical amplifiers and to an optical amplifier for multiple bands.

BACKGROUND

An optical amplifier is a device that is to receive signal light and generate amplified signal light (i.e., signal light with comparatively higher optical power). Typically, the optical amplifier provides optical amplification using a so-called gain medium, which is "pumped" (i.e., provided with energy) by a source, such as a pump laser. In some cases, the optical amplifier may utilize an optical fiber as a gain medium (such a device may be referred to as a fiber amplifier). In such a case, the gain medium may be a glass fiber doped with rare earth ions, such as erbium, neodymium, ytterbium, praseodymium, thulium, and/or the like. Such a fiber may be referred to as an active fiber. In operation, the signal light propagates through the active fiber together with pump light, and the active fiber outputs the amplified signal light that is generated from the signal light and the pump light. Generally, such optical amplifiers include other discrete components associated with controlling, enabling, and/or monitoring optical amplification. Such discrete components may include, for example, one or more isolators, a combiner (e.g., a wavelength division multiplexer (WDM)), a tunable filter, a tap, a photodiode, and/or the like.

SUMMARY

In some implementations, an amplifier device includes a first amplifier configured to amplify signals in a first range of optical wavelengths, where the first amplifier includes: a first portion that includes one or more first optical gain components, and a second portion that includes one or more second optical gain components and a variable optical attenuator (VOA); a second amplifier configured to amplify signals in a second range of optical wavelengths; and a filter for the first range of optical wavelengths and the second range of optical wavelengths, where the filter is located between the first portion and the second portion of the first amplifier.

In some implementations, an erbium doped fiber (EDF) amplifier (EDFA) device includes a first EDFA configured to amplify signals in a first range of optical wavelengths, where the first EDFA includes: a first portion that includes one or more first EDFs, and a second portion that includes one or more second EDFs; a second EDFA configured to amplify signals in a second range of optical wavelengths; and a filter for the first range of optical wavelengths and the second range of optical wavelengths, where the filter is located between the first portion and the second portion of the first EDFA.

In some implementations, an amplifier device includes an amplifier configured to amplify signals in a first range of optical wavelengths, where the amplifier includes: a first portion that includes one or more first optical gain components, and a second portion that includes one or more second optical gain components and a VOA; and a filter for the first range of optical wavelengths and a second range of optical wavelengths, where the filter is located between the first portion and the second portion of the amplifier.

DETAILED DESCRIPTION

Figure 1:
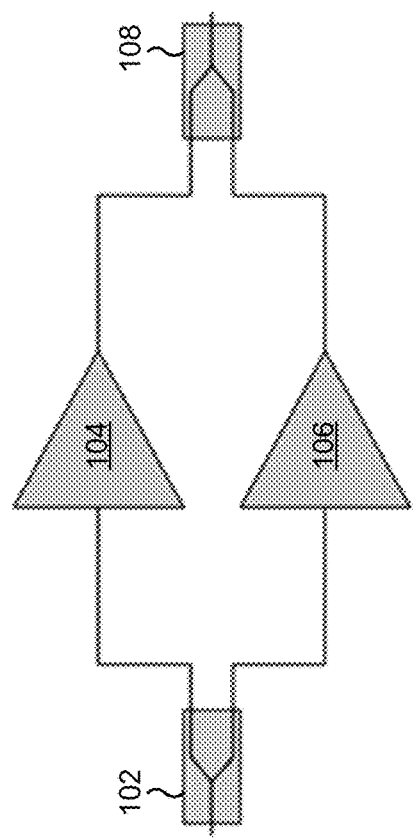
FIG. 1 is a diagram of an example amplifier device described herein.

The following detailed description of example implementations refers to the accompanying drawings. The same reference numbers in different drawings may identify the same or similar elements.

A typical optical amplifier may use an optical fiber as a gain medium. For example, an erbium doped fiber (EDF) may be used as a gain medium for an EDF amplifier (EDFA). EDFAs are an important enabling technology for optical communication. EDFAs provide about 40 nanometers (nm) of amplification bandwidth, which may be realized in a conventional band (C-band) (e.g., 1530 nm to 1570 nm) or a long-wavelength band (L-band) (e.g., 1570 nm to 1610 nm). In some cases, to meet bandwidth demands, and to increase capacity, co-transmission in the C-band and the L-band is employed. In such cases, an integrated C-band EDFA and L-band EDFA may be used for amplification in both bands.

The integrated EDFAs may include a first filter for separating C-band and L-band signals before C-band signals are amplified at the C-band amplifier and L-band signals are amplified at the L-band amplifier. The amplified C-band and L-band signals are combined by a second filter. The filters may cause insertion loss resulting in noise figure (NF) penalty. In addition, the C-band amplifier and the L-band amplifier may need to produce greater output power to compensate for the insertion loss. For example, greater output power may be produced using high-power pumps, which increase a complexity of the integrated EDFAs and/or increase power consumption, among other examples.

Some implementations described herein enable amplification in multiple bands with reduced NF penalty. In some implementations, an amplifier device may include a first amplifier configured to amplify signals in a first range of optical wavelengths (e.g., C-band wavelengths) and a second amplifier configured to amplify signals in a second range of optical wavelengths (e.g., L-band wavelengths). That is, the amplifier device may integrate amplifiers for the first range of optical wavelengths and the second range of optical wavelengths.

The first amplifier may include a first portion that includes one or more first optical gain component (e.g., EDFs) and a second portion that includes one or more second optical gain component (e.g., EDFs). The amplifier device may include a filter for the first range of optical wavelengths and the second range of optical wavelengths (e.g., a C-band and L-band filter) that is located between the first portion and the second portion of the first amplifier. For example, a C-band and L-band filter (C/L filter) may be located within the architecture of a C-band amplifier (e.g., between an input and an output of the C-band amplifier). In this way, NF penalty associated with filter insertion loss may be reduced. Furthermore, the amplifier device described herein is less complex and/or consumes less power relative to conventional integrated EDFAs for C-band and L-band amplification.

In some implementations, a control system is employed for controlling gains of the first amplifier and the second amplifier. The control system may employ, in the first portion of the first amplifier, an additional filter for the first range of optical wavelengths and the second range of optical wavelengths (e.g., an additional C/L filter). Moreover, the control system may employ a first input photodiode that is to receive signals in the first range of optical wavelengths (e.g., an input photodiode for C-band signals) and a second input photodiode that is to receive signals in the second range of optical wavelengths (e.g., an input photodiode for L-band signals). For example, the control system may employ separate input photodiodes for C-band signals and for L-band signals within the architecture of a C-band amplifier. In this way, the control system may provide independent power monitoring of signals in the first range of optical wavelengths (e.g., C-band signals) and in the second range of optical wavelengths (e.g., L-band signals), to thereby enable independent gain control for signals in the first range of optical wavelengths and in the second range of optical wavelengths.

FIG. 1 is a diagram of an example amplifier device 100. In particular, FIG. 1 shows an amplification architecture of the amplifier device 100. The amplifier device 100 may provide integrated C-band and L-band amplification.

The amplifier device 100 includes a first C/L filter 102 that separates an input signal into C-band and L-band signals. A C-band amplifier 104 receives the C-band signal and amplifies the C-band signal. An L-band amplifier 106 receives the L-band signal and amplifies the L-band signal. The amplified signals are received at a second C/L filter 108 and combined into an output signal. Accordingly, the amplifier device 100 uses what may be referred to as a split-amplify-combine approach. The split-amplify-combine approach may result in significant NF penalty, as described above.

As indicated above, FIG. 1 is provided as an example. Other examples may differ from what is described with regard to FIG. 1.

Figure 2:
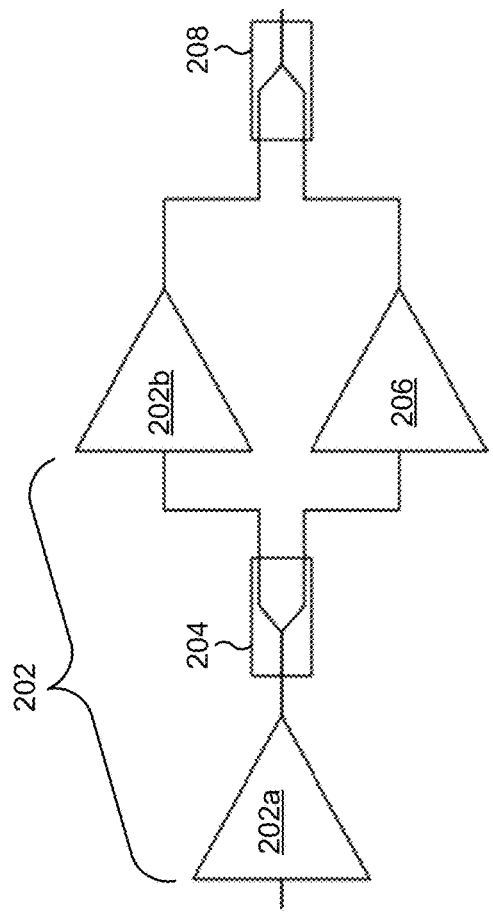
FIG. 2 is a diagram of an example amplifier device described herein.

FIG. 2 is a diagram of an example amplifier device 200. In particular, FIG. 2 shows an amplification architecture of the amplifier device 200. The amplifier device 200 may provide amplification of an optical signal received at the amplifier device 200. The optical signal may be transmitted by a transmitter and include data for a receiver. Accordingly, the amplifier device 200 may be a component of an optical system (e.g., a network) that is between the transmitter and the receiver.

The amplifier device 200 may provide integrated amplification for multiple ranges of optical wavelengths. For example, the amplifier device 200 may provide integrated C-band and L-band amplification. While the amplifier device 200 may be described as including amplifiers for C-band and L-band, the amplifier device 200 may include amplifiers for other ranges of optical wavelengths. Moreover, the amplifier device 200, which is described herein using an example of two amplifiers for different ranges of optical wavelengths, may include more than two amplifiers for different ranges of optical wavelengths. Accordingly, the amplifier device 200 may include amplifiers for any combination of C-band, L-band, original band (O-band) (e.g., 1260 nm to 1360 nm), extended band (E-band) (e.g., 1360 nm to 1460 nm), or short band (S-band) (e.g., 1460 nm to 1530 nm).

As shown in FIG. 2, the amplifier device 200 may include a first amplifier 202, a first filter 204 (e.g., a first C/L filter), a second amplifier 206, and a second filter 208 (e.g., a second C/L filter). The first amplifier 202 may be configured to amplify signals in a first range of optical wavelengths (which may be referred to herein as "the first range"). For example, the first amplifier 202 may be a C-band amplifier. The second amplifier 206 may be configured to amplify signals in a second range of optical wavelengths (which may be referred to herein as "the second range"). For example, the second amplifier 206 may be an L-band amplifier. In some implementations, the first amplifier 202 may be an L-band amplifier and the second amplifier 206 may be a C-band amplifier. In some implementations, the first amplifier 202 and the second amplifier 206 may be different ones of a C-band amplifier, an L-band amplifier, an O-band amplifier, an E-band amplifier, and an S-band amplifier, as described above.

As shown, the first amplifier 202 may include a first portion 202a and a second portion 202b. That is, the first portion 202a and the second portion 202b together may provide the functionality of an amplifier for the first range (e.g., the first portion 202a and the second portion 202b may provide amplification over the first range). For example, the first portion 202a and the second portion 202b together may provide the functionality of a C-band amplifier (e.g., the first portion 202a and the second portion 202b may provide amplification over the C-band).

In some implementations, the first portion 202a and the second portion 202b may be different from each other. For example, the first portion 202a may include a first plurality of components of the first amplifier 202 and the second portion 202b may include second plurality of components of the first amplifier 202, and the first plurality of components may be different from the second plurality of components. As an example, the first portion 202a and the second portion 202b may include one or more different components and/or may include different quantities of components, among other examples.

In use, the first portion 202a of the first amplifier 202 may receive an optical signal. The optical signal may include a signal in the first range and a signal in the second range. For example, the optical signal may include a C-band signal and an L-band signal. The first portion 202a may amplify the optical signal in the first range and in the second range. That is, the first portion 202a may be configured to pass signals in the first range and pass signals in the second range. In some aspects, an L-band signal may achieve 4-5 dB of gain after passing through the first portion 202a of a C-band amplifier.

The first filter 204 may be located between the first portion 202a and the second portion 202b of the first amplifier 202. In addition, the first filter 204 may be located between the first portion 202a of the first amplifier 202 and the second amplifier 206. That is, the amplifier device 200 may not include a filter for the first and second ranges before the first amplifier 202 (e.g., before the first portion 202a). In this way, insertion loss caused by placement of a filter before the first amplifier 202 may be reduced, resulting in reduced NF penalty.

The first filter 204 may be configured to separate the optical signal into a signal in the first range (e.g., in the C-band) and a signal in the second range (e.g., in the L-band). The first filter 204 may provide the signal in the first range to the second portion 202b, and provide the signal in the second range to the second amplifier 206. The second portion 202b may receive the signal in the first range and further amplify the signal in the first range. The second amplifier 206 may receive the signal in the second range and further amplify the signal in the second range. The second filter 208 may be configured to combine the amplified signal in the first range with the amplified signal in the second range into an amplified optical signal. The amplifier device 200 may provide the amplified optical signal to the receiver, may provide the amplified optical signal to one or more intermediate components (e.g., additional amplifiers) between the amplifier device 200 and the receiver, and/or may perform further processing of the amplified optical signal, among other examples.

As indicated above, FIG. 2 is provided as an example. Other examples may differ from what is described with regard to FIG. 2.

Figure 3:
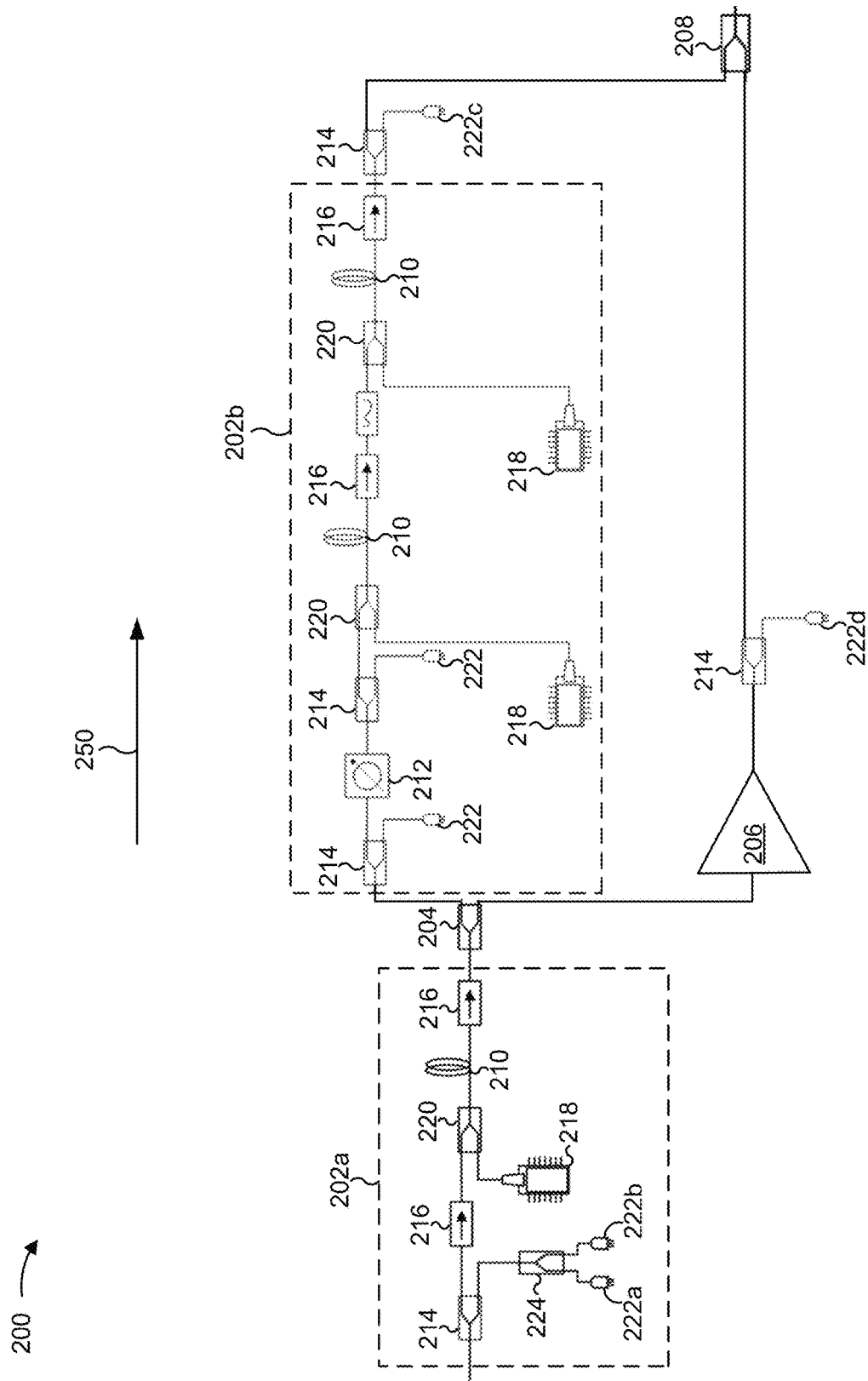
FIG. 3 is a diagram of an example amplifier device described herein.

FIG. 3 is a diagram of the example amplifier device 200. In particular, FIG. 3 shows example components for the first portion 202a and the second portion 202b of the first amplifier 202. As shown in FIG. 3, and described above, the first filter 204 may be located between the first portion 202a and the second portion 202b.

The first portion 202a may include one or more first optical gain components 210 of the first amplifier 202, and the second portion 202b may include one or more second optical gain components 210 of the first amplifier 202. An optical gain component 210 may be an optical fiber (e.g., an active fiber). For example, an optical gain component 210 may an EDF (e.g., an EDF coil). That is, the amplifier device 200 may be an EDFA device.

In some implementations, the second portion 202b may include a variable optical attenuator (VOA) 212 of the first amplifier 202, and the first portion 202a may not include a VOA. That is, the amplifier device 200 may include a single VOA that is in the second portion 202b. The VOA 212 of the second portion 202b may be located between the one or more first optical gain components 210 of the first portion 202a and the one or more second optical gain components 210 of the second portion 202b. In other words, an optical gain component 210 of the second portion 202b is not before the VOA 212 in a direction of propagation 250.

In some implementations, the first portion 202a may include a first optical gain component 210 (e.g., in the direction of propagation 250) of the first amplifier 202, as well as related components to the first optical gain component 210. Here, the second portion 202b may include the remaining components of the first amplifier 202. For example, the second portion 202b may include a second optical gain component 210 and/or a third optical gain component 210 (e.g., in the direction of propagation 250), as well as related components of the second and/or third optical gain components 210. In some implementations, the first portion 202a may include the first optical gain component 210 and the second optical gain component 210, as well as related components of the first and second optical gain component 210. Here, the second portion 202b may include the remaining components of the first amplifier 202. For example, the second portion 202b may include the third optical gain component 210, as well as related components of the third optical gain component 210. Accordingly, the first filter 204 may be located after (e.g., in the direction of propagation 250) at least the first optical gain component 210 of the first amplifier 202.

Related components of an optical gain component 210 may include one or more of a tap 214, an isolator 216, a pump 218, a wavelength division multiplexer (WDM) 220, or a monitor photodiode 222, among other examples. The related components in the first portion 202a may be configured to pass signals in the first range and in the second range. For example, the first portion 202a may include a tap 214 for the first range and the second range (e.g., a C-band and L-band tap), a WDM 220 for the first range and the second range (e.g., a C-band and L-band WDM), or the like. However, the optical gain components 210 in the first portion 202a may be configured (e.g., based on a length of an EDF) to amplify signals in the first range and not in the second range (though amplification of signals in the second range may occur, as described above). The related components in the second portion 202b may be configured to pass signals only in the first range. Additionally, the optical gain components 210 in the second portion 202b may be configured to amplify signals in the first range and not in the second range.

In addition, the first filter 204 may be located before (e.g., in the direction of propagation 250) the VOA 212. In this way, the amplifier device 200 may enable independent gain control in the first range and in the second range, as described below. Moreover, whether components of the first amplifier 202 are included in the first portion 202a (e.g., before the first filter 204) or in the second portion 202b (e.g., after the first filter 204) may be based on a location of the VOA 212. For example, if the VOA 212 is located between the first optical gain component 210 and the second optical gain component 210 of the first amplifier 202, then the first portion 202a may include the first optical gain component 210 and the second portion 202b may include the second optical gain component 210. As another example, if the VOA 212 is located between the second optical gain component 210 and the third optical gain component 210 of the first amplifier 202, then the first portion 202a may include the first and second optical gain components 210 and the second portion 202b may include the third optical gain component 210.

The second amplifier 206 may include an architecture similar to that of the first amplifier 202. That is, the architecture of the second amplifier 206 may be similar to a combination of the first portion 202a and the second portion 202b, as described above, but without a filter between the first portion 202a and the second portion 202b. For example, the second amplifier 206 may include one or more optical gain components (e.g., EDFs) and related components, as described above. The related components of the second amplifier 206 may be configured to pass only signals in the second range (e.g., L-band signals). Additionally, the optical gain components in the second amplifier 206 may be configured (e.g., based on a length of an EDF) to amplify signals in the second range and not in the first range.

In some implementations, the amplifier device 200 may include a control system. The control system may include an additional filter 224 (e.g., a C/L filter) in the first portion 202a. The additional filter 224 may be configured to separate the optical signal received at the first portion 202a into a signal in the first range (e.g., in the C-band) and a signal in the second range (e.g., in the L-band). For example, the optical signal may be received at a tap 214 located at an input of the first portion 202a, and the tap 214 may provide the optical signal to the additional filter 224.

The control system may also include, in the first portion 202a, separate input monitor photodiodes for signals in the first range (e.g., C-band signals) and signals in the second range (e.g., L-band signals). For example, a first input photodiode 222a of the control system may receive signals in only the first range from the additional filter 224, and a second input photodiode 222b of the control system may receive signals in only the second range from the additional filter 224. The photodiodes 222a and 222b may be used to monitor power levels (e.g., obtain information relating to power levels) of signals in the first range and in the second range, respectively, at an input of the first portion 202a.

Moreover, the control system may include separate output monitor photodiodes for signals in the first range (e.g., C-band signals) and signals in the second range (e.g., L-band signals). For example, a first output photodiode 222c may receive signals in only the first range from the second portion 202b of the first amplifier 202, and a second output photodiode 222d may receive signals in only the second range from the second amplifier 206. The photodiodes 222c and 222d may be used to monitor power levels (e.g., obtain information relating to power levels) of signals in the first range and in the second range, respectively, at respective outputs of the second portion 202b and the second amplifier 206. In this way, a gain of signals in the first range and a gain of signals in the second range may be independently monitored and controlled.

As indicated above, FIG. 3 is provided as an example. Other examples may differ from what is described with regard to FIG. 3.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An amplifier device, comprising:
    a first amplifier configured to amplify signals in a first range of optical wavelengths,
        wherein the first amplifier comprises:
            a first portion that comprises one or more first optical gain components, wherein the first portion is configured to pass signals in the first range of optical wavelengths and a second range of optical wavelengths; and
            a second portion that comprises one or more second optical gain components and a variable optical attenuator (VOA);
    a second amplifier configured to amplify signals in the second range of optical wavelengths; and
    a device configured to separate an optical signal into a first signal in the first range of optical wavelengths and a second signal in the second range of optical wavelengths,
        wherein the device is located between the first portion and the second portion of the first amplifier.

2. The amplifier device of claim 1, wherein the first range of optical wavelengths comprises a conventional band, and the second range of optical wavelengths comprises a long-wavelength band.

3. The amplifier device of claim 1, wherein the one or more first optical gain components and the one or more second optical gain components comprise optical fibers.

4. The amplifier device of claim 3, wherein the optical fibers comprise erbium doped fibers.

5. The amplifier device of claim 1, wherein the first portion further comprises a first plurality of components of the first amplifier and the second portion further comprises a second plurality of components of the first amplifier, and
    wherein the first plurality of components is different from the second plurality of components.

6. The amplifier device of claim 1, wherein the VOA of the second portion is located between the one or more first optical gain components of the first portion and the one or more second optical gain components of the second portion.

7. The amplifier device of claim 1, wherein the first portion further comprises:
    an additional device configured to separate the optical signal into a third signal in the first range of optical wavelengths and a fourth signal in the second range of optical wavelengths;
    a first input photodiode that is to receive the third signal in the first range of optical wavelengths from the additional device; and a second input photodiode that is to receive the fourth signal in the second range of optical wavelengths from the additional device.

8. The amplifier device of claim 1, further comprising:
a first output photodiode that is to receive signals in the first range of optical wavelengths from the second portion; and
a second output photodiode that is to receive signals in the second range of optical wavelengths from the second amplifier.

9. The amplifier device of claim 1, wherein the device is configured to provide the first signal in the first range of optical wavelengths to the second portion of the first amplifier and to provide the second signal in the second range of optical wavelengths to the second amplifier.

10. An erbium doped fiber (EDF) amplifier (EDFA) device, comprising:
a first EDFA configured to amplify signals in a first range of optical wavelengths,
wherein the first EDFA comprises:
a first portion that comprises one or more first EDFs, wherein the first portion is configured to pass signals in the first range of optical wavelengths and a second range of optical wavelengths; and
a second portion that comprises one or more second EDFs;
a second EDFA configured to amplify signals in the second range of optical wavelengths; and
a device configured to separate an optical signal into a first signal in the first range of optical wavelengths and a second signal in the second range of optical wavelengths,
wherein the device is located between the first portion and the second portion of the first EDFA.

11. The EDFA device of claim 10, wherein the second EDFA comprises one or more third EDFs.

12. The EDFA device of claim 10, wherein the first EDFA further comprises a single variable optical attenuator that is in the second portion.

13. The EDFA device of claim 10, wherein the first portion further comprises:
an additional device configured to separate the optical signal into a third signal in the first range of optical wavelengths and a fourth signal in the second range of optical wavelengths;
a first input photodiode that is to receive the third signal in the first range of optical wavelengths from the additional device; and
a second input photodiode that is to receive the fourth signal in the second range of optical wavelengths from the additional device.

14. The EDFA device of claim 10, further comprising:
a first output photodiode that is to receive signals in the first range of optical wavelengths from the second portion; and
a second output photodiode that is to receive signals in the second range of optical wavelengths from the second EDFA.

15. An amplifier device, comprising:
an amplifier configured to amplify signals in a first range of optical wavelengths,
wherein the amplifier comprises:
a first portion that comprises one or more first optical gain components, wherein the first portion is configured to pass signals in the first range of optical wavelengths and a second range of optical wavelengths; and
a second portion that comprises one or more second optical gain components and a variable optical attenuator (VOA); and
a device configured to separate an optical signal into a first signal in the first range of optical wavelengths and a second signal in the second range of optical wavelengths,
wherein the device is located between the first portion and the second portion of the amplifier.

16. The amplifier device of claim 15, wherein the one or more first optical gain components and the one or more second optical gain components comprise erbium doped fibers.

17. The amplifier device of claim 15, wherein the first portion further comprises a first plurality of components of the amplifier and the second portion further comprises a second plurality of components of the amplifier, and
wherein the first plurality of components is different from the second plurality of components.

18. The amplifier device of claim 15, wherein the VOA is located between the one or more first optical gain components of the first portion and the one or more second optical gain components of the second portion.

19. The amplifier device of claim 15, wherein the first portion further comprises:
an additional device configured to separate the optical signal into a third signal in the first range of optical wavelengths and a fourth signal in the second range of optical wavelengths;
a first input photodiode that is to receive the third signal in the first range of optical wavelengths from the additional device; and
a second input photodiode that is to receive the fourth signal in the second range of optical wavelengths from the additional device.

20. The EDFA device of claim 10, wherein the first range of optical wavelengths comprises a conventional band, and the second range of optical wavelengths comprises a long-wavelength band.

* * * * *